United States Patent
Babinski et al.

(10) Patent No.: US 7,864,482 B1
(45) Date of Patent: Jan. 4, 2011

(54) DISK DRIVE CALIBRATING VCM NOTCH FILTER BY INCREASING THE WIDTH AND/OR THE DEPTH OF THE NOTCH

(75) Inventors: Alexander Babinski, Laguna Niguel, CA (US); Duc T. Phan, Saratoga, CA (US); Jun Huang, Lake Forest, CA (US); Yanbin Song, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 20 days.

(21) Appl. No.: 12/394,406

(22) Filed: Feb. 27, 2009

(51) Int. Cl.
G11B 21/02 (2006.01)
G11B 5/596 (2006.01)
G11B 27/36 (2006.01)

(52) U.S. Cl. ............... 360/75; 360/31; 360/77.02; 360/78.04

(58) Field of Classification Search ............... None
See application file for complete search history.

(56) References Cited

U.S. PATENT DOCUMENTS

| 5,325,247 | A | 6/1994 | Ehrlich et al. |
|---|---|---|---|
| 5,680,272 | A | 10/1997 | Kadlec et al. |
| 6,122,125 | A | 9/2000 | Clare et al. |
| 6,219,196 | B1 | 4/2001 | Semba et al. |
| 6,246,536 | B1 | 6/2001 | Galloway |
| 6,567,230 | B1 | 5/2003 | Kagami et al. |
| 6,574,065 | B1 | 6/2003 | Sri-Jayantha et al. |
| 6,741,914 | B1 | 5/2004 | Tze Ming Pang |
| 6,765,749 | B2 | 7/2004 | Galloway et al. |
| 6,847,502 | B1 | 1/2005 | Codilian |
| 6,930,853 | B2 | 8/2005 | Settje et al. |
| 6,958,881 | B1 | 10/2005 | Codilian et al. |
| 7,009,803 | B2 | 3/2006 | Sharma et al. |
| 7,016,142 | B2 | 3/2006 | Jung et al. |
| 7,023,646 | B2 | 4/2006 | Bahirat |
| 7,031,096 | B2 | 4/2006 | Kisaka |
| 7,248,428 | B2 | 7/2007 | Kim et al. |
| 2002/0093754 | A1* | 7/2002 | Zhang et al. ............ 360/77.04 |
| 2007/0019321 | A1 | 1/2007 | Kim et al. |

OTHER PUBLICATIONS

US 6,987,629, 01/2006, Fulkerson et al. (withdrawn)

* cited by examiner

*Primary Examiner*—Andrew L Sniezek

(57) ABSTRACT

A disk drive is disclosed comprising a disk, a head, a voice coil motor (VCM) for actuating the head over the disk, and control circuitry comprising a notch filter for generating a VCM control signal, wherein a notch of the notch filter comprises a frequency, a width, and a depth. The notch filter is calibrated by initializing at least one of the width and the depth of the notch, measuring a quality metric of the notch filter, and increasing at least one of the width and the depth of the notch until the quality metric indicates good performance.

24 Claims, 8 Drawing Sheets

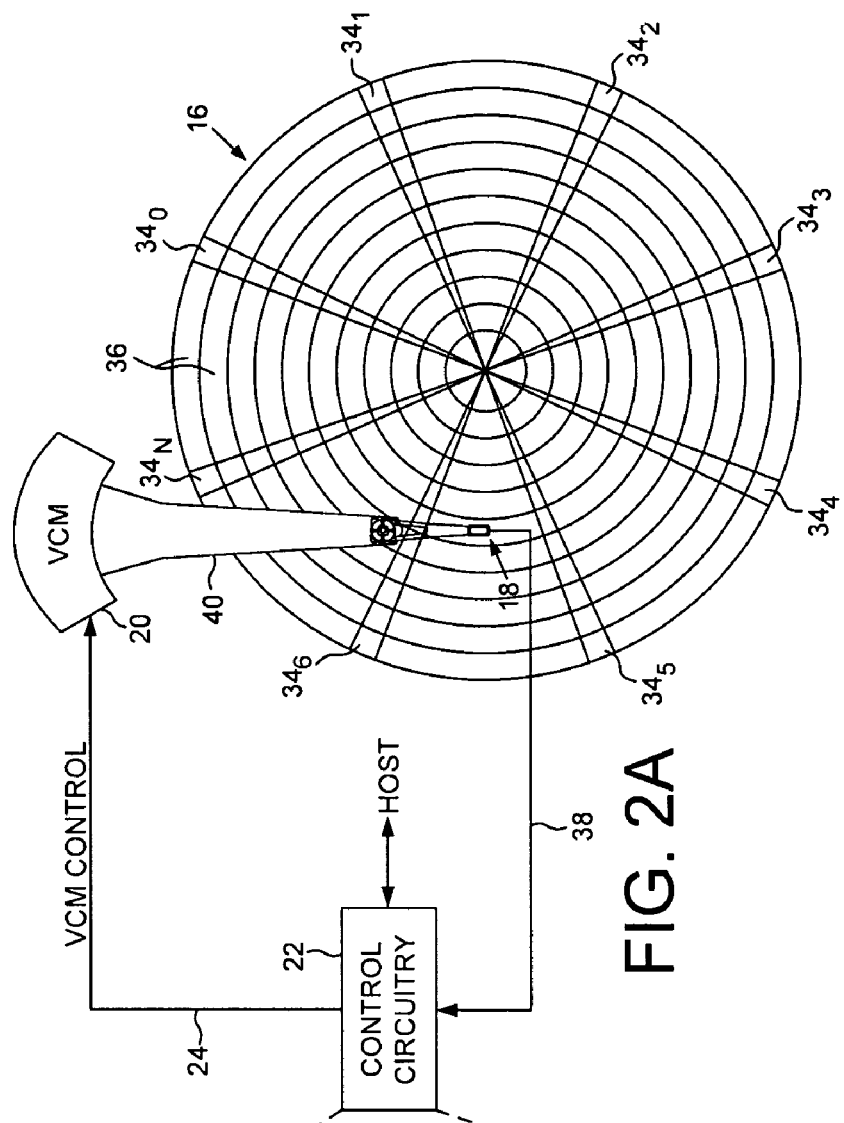
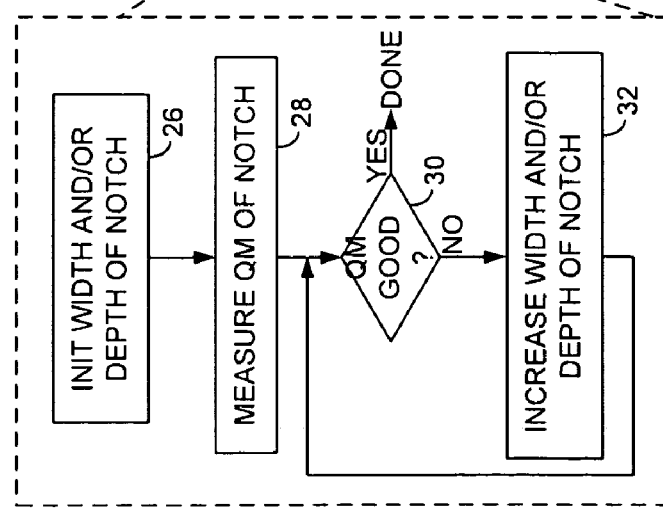

$$\text{NOTCH}(z^{-1}) = \frac{A_0}{B_0} * \frac{1 - 2\cos\theta r_1 z^{-1} + r_1^2 z^{-2}}{1 - 2\cos\theta r_2 z^{-1} + r_2^2 z^{-2}} = \frac{A_0 - a_1\cos\theta z^{-1} + A_2 z^{-2}}{B_0 - b_1\cos\theta z^{-1} + B_2 z^{-2}}$$

FIG. 5A $$\text{NOTCH}(f, z^{-1}) = \frac{A_0 + (A_1 + C_1(f - f_0))z^{-1} + A_2 z^{-2}}{B_0 + (B_1 + D_1(f - f_0))z^{-1} + B_2 z^{-2}}$$

FIG. 5B $$f = f_{T_0} - E*(T - T_0)$$

FIG. 5C $$ERC = \frac{1}{1 + GH}$$

DISK DRIVE CALIBRATING VCM NOTCH FILTER BY INCREASING THE WIDTH AND/OR THE DEPTH OF THE NOTCH

BACKGROUND

Description of the Related Art

When manufacturing a disk drive, servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

BRIEF DESCRIPTION OF THE DRAWINGS

FIG. 2A shows a disk drive according to an embodiment of the present invention comprising a disk, a head actuated over the disk by a voice coil motor (VCM), and control circuitry.

FIG. 2B is a flow diagram executed by the control circuitry according to an embodiment of the present invention for calibrating a notch filter used to generate a VCM control signal.

FIG. 5A shows a transfer function for the notch filter according to an embodiment of the present invention.

FIG. 5B shows an embodiment of the present invention wherein the transfer function of the notch filter is written as a function of the notch frequency.

FIG. 5C shows an embodiment of the present invention wherein the notch frequency is adjusted relative to temperature.

DETAILED DESCRIPTION OF EMBODIMENTS OF THE INVENTION

Figure 4:
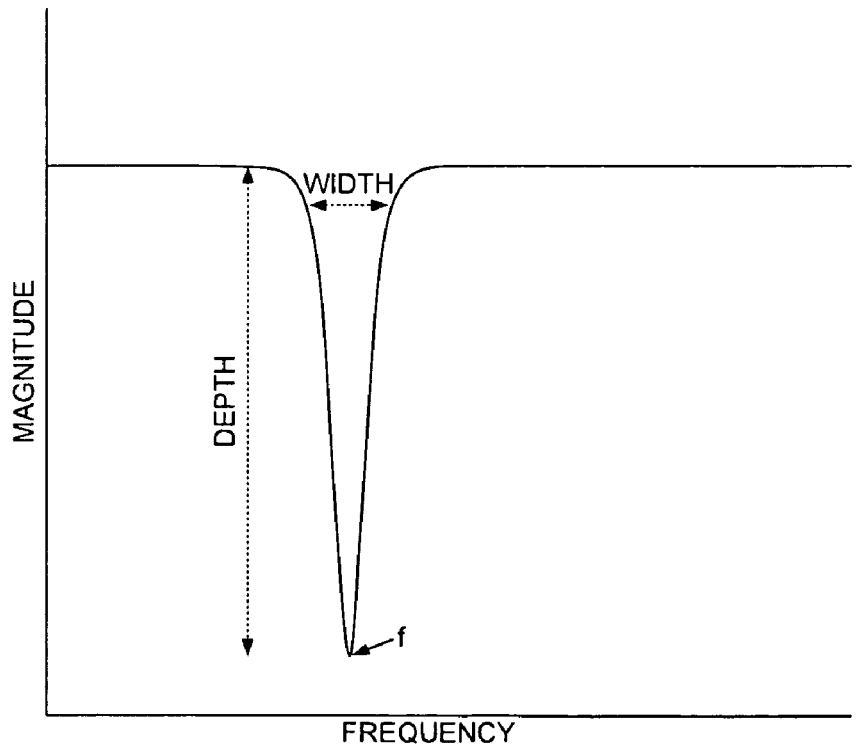
FIG. 4 shows an embodiment of the present invention wherein a notch of the notch filter comprises a frequency, a width, and a depth.

FIG. 2A shows a disk drive according to an embodiment of the present invention comprising a disk 16, a head 18, a voice coil motor (VCM) 20 for actuating the head 18 over the disk 16, and control circuitry 22 comprising a notch filter for generating a VCM control signal 24, wherein a notch of the notch filter comprises a frequency, a width, and a depth (FIG. 4). FIG. 2B is a flow diagram executed by the control circuitry 22 to calibrate the notch filter according to an embodiment of the present invention. At least one of the width and the depth of the notch is initialized (step 26), and a quality metric of the notch filter is measured (step 28). At least one of the width and the depth of the notch is increased (step 32) until the quality metric indicates good performance (step 30).

In the embodiment of FIG. 2A, the disk 16 comprises a plurality of servo sectors $34_0$-$34_N$ that define a plurality of tracks 36. The control circuitry 22 processes the read signal 38 to demodulate the servo sectors $34_0$-$34_N$ into a position error signal (PES). The PES is filtered with a suitable compensation filter and the notch filter to generate the control signal 24 applied to the VCM 20 which rotates an actuator arm 40 about a pivot in order to position the head 18 radially over the disk 16 in a direction that reduces the PES. The servo sectors $34_0$-$34_N$ may comprise any suitable position information, such as a track address for coarse positioning and servo bursts for fine positioning.

Figure 1:
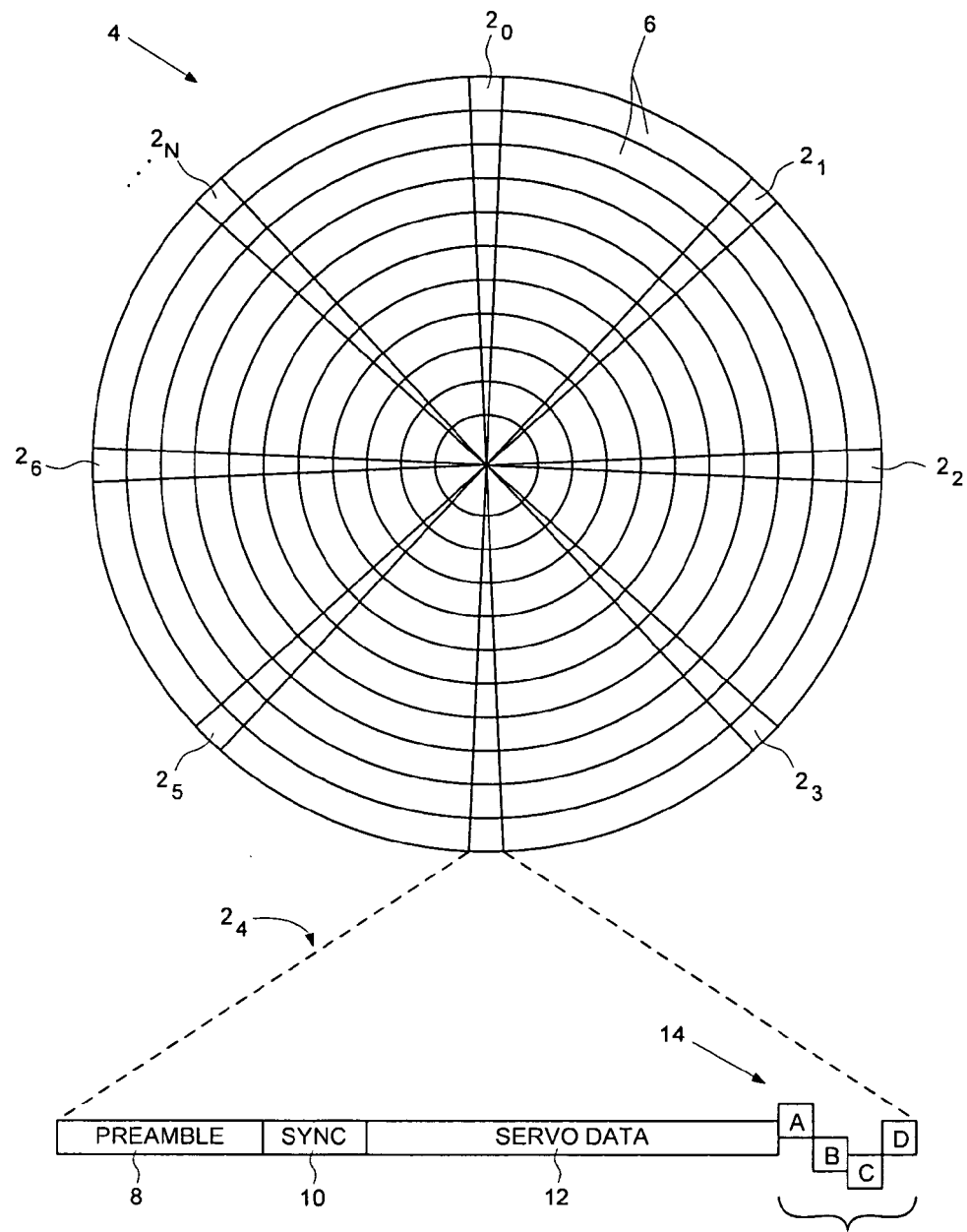
FIG. 1 shows a prior art disk format comprising a plurality of concentric data tracks defined by embedded servo sectors.
Figure 3:
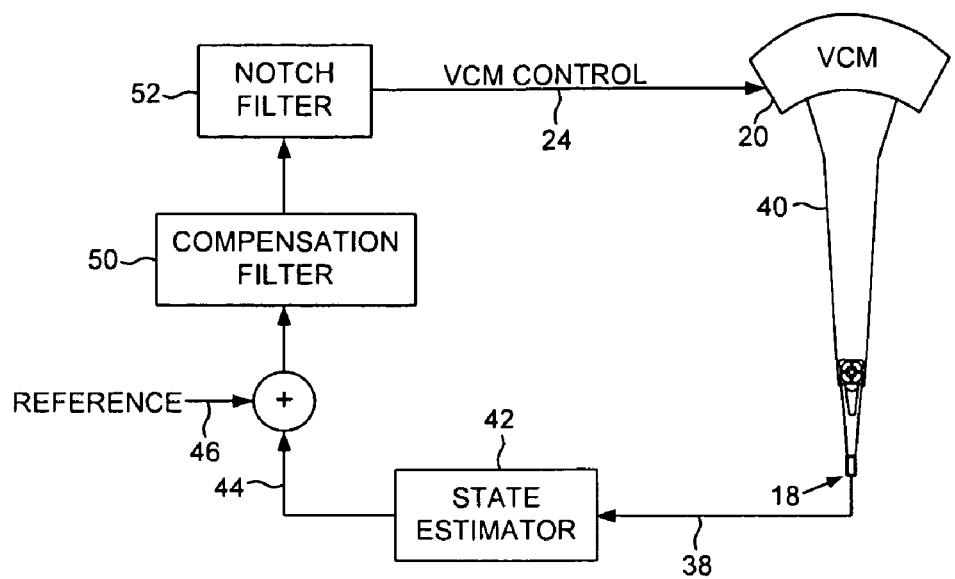
FIG. 3 shows control circuitry according to an embodiment of the present invention including a state estimator, a compensation filter, and a notch filter.

FIG. 3 shows example control circuitry according to an embodiment of the present invention for generating the VCM control signal 24. A state estimator 42 processes the read signal 38 to generate an estimated state 44 (e.g., position) of the head 18. The estimated state 44 of the head 18 is compared to a reference 46 to generate an error signal (e.g., a PES) which is filtered by a suitable compensation filter 50 and then by the notch filter 52. The compensation filter 50 is designed to achieve a desired closed-loop frequency response of the servo system, and the notch filter 52 is designed to attenuate one or more resonant frequencies of the servo system.

FIG. 4 shows an example frequency response of the notch filter 52 comprising a notch at a target frequency f, wherein the notch comprises a width and a depth. It is desirable to calibrate the parameters of the notch filter (f, width and/or depth) so that the resonant frequency is attenuated without degrading the performance of the servo system.

FIG. 5A shows a transfer function of a notch filter according to an embodiment of the present invention. The corresponding notch is represented by a pair of poles and zeros and their conjugates located inside a unit circle at an angle $\theta$ and at radii r2 and r1 for the poles and the zeros respectively. The radii r1 and r2 define the width and depth of the notch, and the frequency of the notch is defined by the relationship $\theta = 2\pi f / F_s$, where f is the notch frequency and $F_s$ is the sampling frequency. If the notch frequency f is assumed to be constrained to a relatively small range, the term case in FIG. 5A can be linearized around a predetermined angle $\theta_0$ such that the transfer function can be represented as a function of the notch frequency f as shown in FIG. 5B. In FIG. 5B $A_0, A_1, A_2, B_0, B_1, B_2, C_1$ and $D_1$ are coefficients that define the width and depth of the notch, and $(f-f_0)$ is the frequency deviation from the linearized center frequency $f_0$.

A resonant frequency compensated by the notch filter 52 may shift due to a fluctuation in temperature. Therefore, in one embodiment a shift in temperature is compensated using the equation shown in FIG. 5C. In FIG. 5C, $T_0$ corresponds to the temperature when the initial notch frequency $f_{T0}$ is calibrated, T is the current temperature, and E is a gain defining the desired notch frequency adjustment per degree of temperature change. As described in greater detail below, in one embodiment the notch frequency f is adjusted relative to the current temperature, and then the width and/or depth of the notch filter is calibrated (by adjusting the coefficients $A_0$, $A_1$, $A_2$, $B_0$, $B_1$, $B_2$, $C_1$ and $D_1$).

The notch filter 52 may be calibrated at any suitable time, and in one embodiment, the notch filter 52 is calibrated for each disk drive during a manufacturing procedure. In addition, the notch filter 52 may be re-calibrated while the disk drive is in-the-field, such as after a predetermined interval, after detecting performance degradation in the servo system, and/or after detecting a temperature change.

Figure 6A:
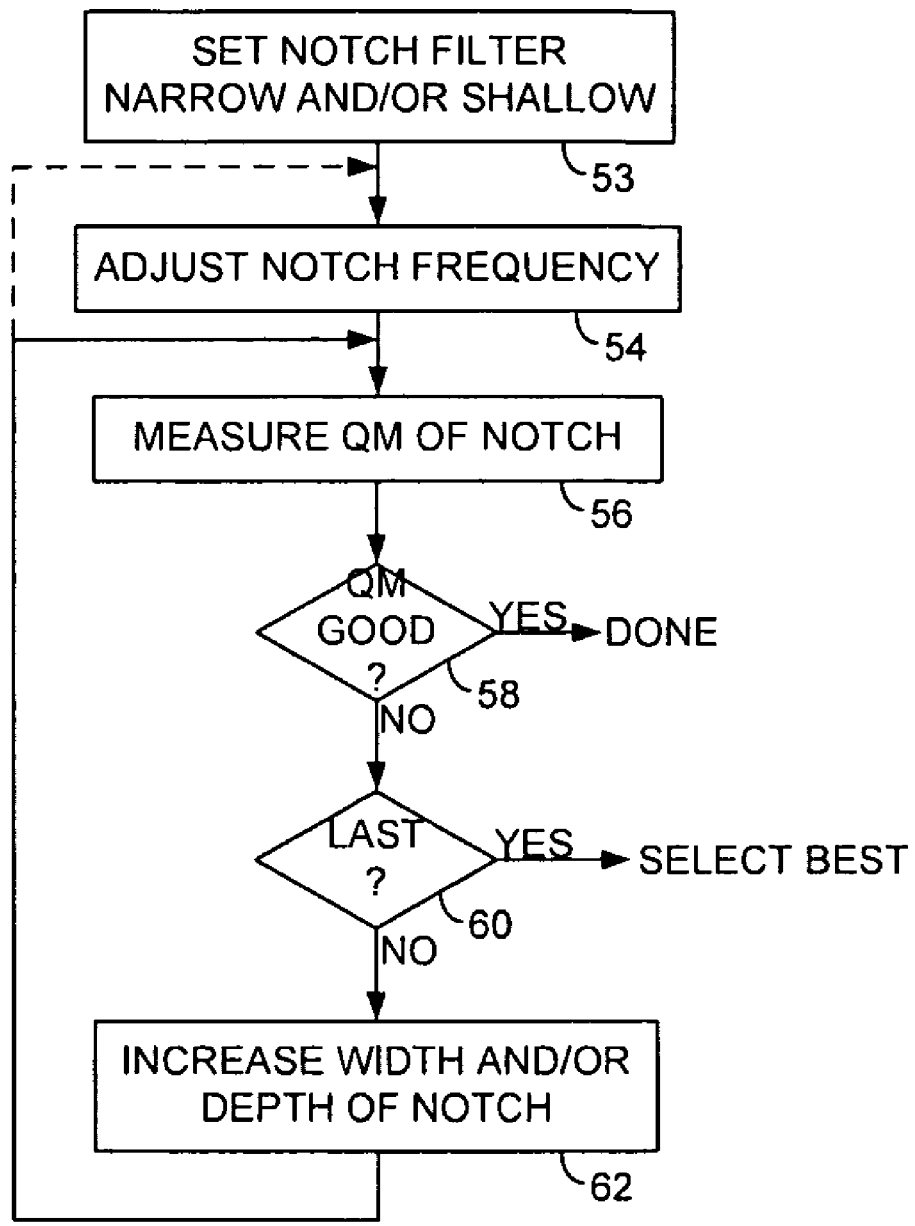
FIG. 6A is a flow diagram according to an embodiment of the present invention wherein the notch filter is calibrated by incrementally increasing the width and/or depth of the notch until a quality metric indicates good performance.

FIG. 6A is a flow diagram according to an embodiment of the present invention for calibrating the notch filter 52. At least one of the width and/or depth of the notch are initialized by adjusting one or more of the coefficients $A_0$, $A_1$, $A_2$, $B_0$, $B_1$, $B_2$, $C_1$ and $D_1$ (step 53). For example, the notch may be initialized by setting the width narrow and/or by setting the depth shallow. The notch frequency is adjusted (step 54) so as to substantially align with the target resonant frequency. For example, the notch frequency may be adjusted in response to the current temperature as described above with reference to FIG. 5C. In another embodiment described in greater detail below, the target resonant frequency is measured (e.g., relative to an error rejection curve) and the notch frequency adjusted accordingly. After adjusting the notch frequency, a quality metric (QM) of the notch filter is measured (step 56) to determine if the calibration should continue. Any suitable quality metric may be measured, such as the magnitude of a resonant peak as determined from an error rejection curve. If the quality metric indicates poor performance (step 58) (e.g., if a measured resonant peak exceeds a threshold), then the width of the notch and/or the depth of the notch are increased (step 62). In one embodiment, the width and/or depth of the notch may be increased by selecting a predetermined set of coefficients $A_0$, $A_1$, $A_2$, $B_0$, $B_1$, $B_2$, $C_1$ and $D_1$. This process is then repeated until the quality metric indicates good performance (step 58) or the number of width and/or depth settings is exhausted (step 60). In one embodiment, if after all of the width and/or depth settings have been tried and the quality metric still indicates poor performance, then the width and/or depth settings that provided the best performance (generated the best quality metric) are selected as the operating settings.

In one embodiment, the iterations in the flow diagram of FIG. 6A may or may not include re-adjusting the notch frequency (step 54) after increasing the width and/or depth of the notch. In one embodiment, adjusting the width and/or depth of the notch may not change significantly the target resonant frequency, and therefore the notch frequency is not re-adjusted. In another embodiment, adjusting the width and/or depth of the notch may cause the resonant frequency to shift, and therefore the notch frequency is re-adjusted (step 54) for each iteration. In yet another embodiment, adjusting the width and or depth of the notch may perturb another resonant frequency in the servo system which may then become the resonant frequency targeted by the notch filter (e.g., if the magnitude of the new resonant frequency exceeds that of the old resonant frequency).

Figure 6B:
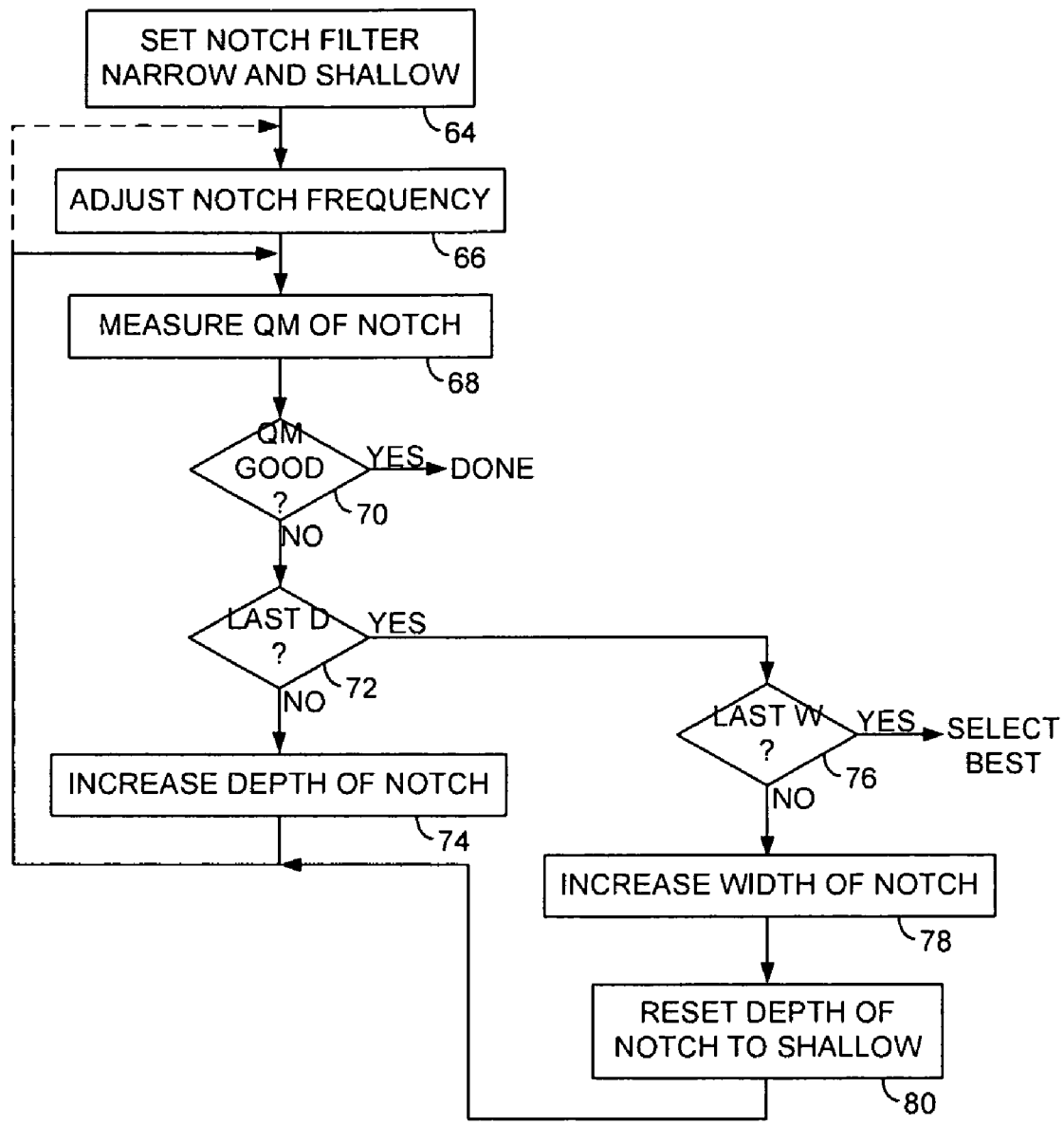
FIG. 6B is a flow diagram according to an embodiment of the present invention wherein the notch filter is calibrated by sweeping the depth setting of the notch for each width setting until the quality metric indicates good performance.

FIG. 6B is a flow diagram for calibrating the notch filter according to another embodiment of the present invention. In this embodiment, the width of the notch is initialized to a narrow setting and the depth of the notch is initialized to a shallow setting (step 64). The notch frequency is adjusted as described above (step 66), and the quality metric of the notch filter is measured (step 68). If the quality metric indicates poor performance (step 70), then the depth of the notch is increased (step 74) and the process is repeated until all of the of the depth settings have been tried (step 72). After trying the last depth setting, the width of the notch is increased (step 78) and the depth of the notch is reset to the shallow setting (step 80). The process is then repeated by sweeping the depth settings of the notch for the new width setting. This processes is repeated until all of the width settings have been tried (step 76). In an alternative embodiment, the width settings for the notch may be swept over each depth setting.

Figures 7A, 7B:
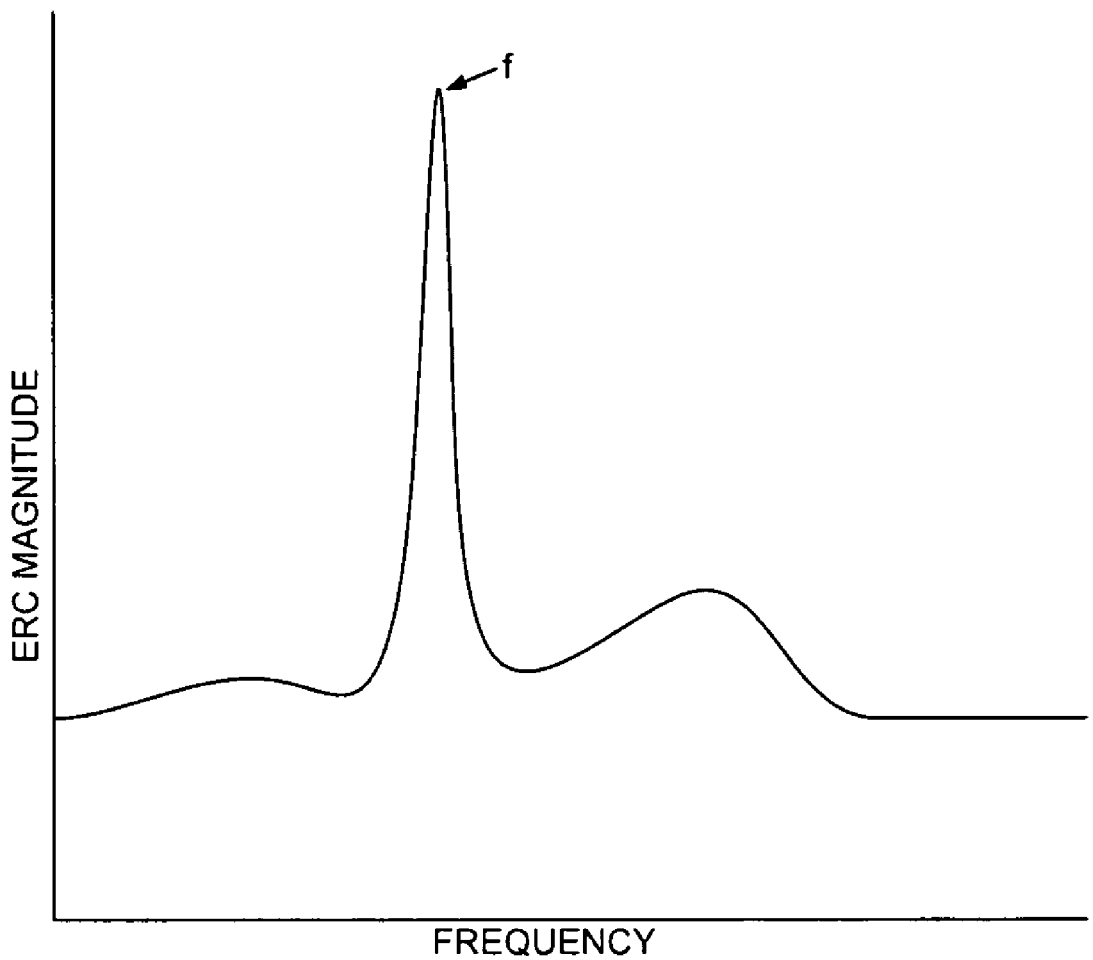
FIG. 7A shows an embodiment of the present invention wherein an error rejection curve is evaluated to adjust the notch frequency and/or generate the quality metric of the notch filter.
FIG. 7B shows a frequency response of an error rejection curve according to an embodiment of the present invention, including a resonant peak frequency to be compensated by the notch filter.

In one embodiment, a resonant frequency targeted by the notch filter 52 is measured relative to an error rejection curve, the transfer function for which is shown in FIG. 7A wherein G represents the transfer function of the compensation filter 50 and the notch filter 52 (FIG. 3) and H represents the plant (the VCM). An example magnitude of an error rejection curve is shown in FIG. 7B, including a peak at frequency f representing the resonant frequency to be targeted by the notch filter. In one embodiment, when calibrating the notch filter 52 the notch frequency is adjusted (step 54 of FIG. 6A) to match the resonant frequency identified from the error rejection curve. The magnitude of the resonant peak measured in response to the error rejection curve may also be used as the quality metric to determine whether the calibrated width and depth of the notch filter provides adequate performance.

Figure 8:
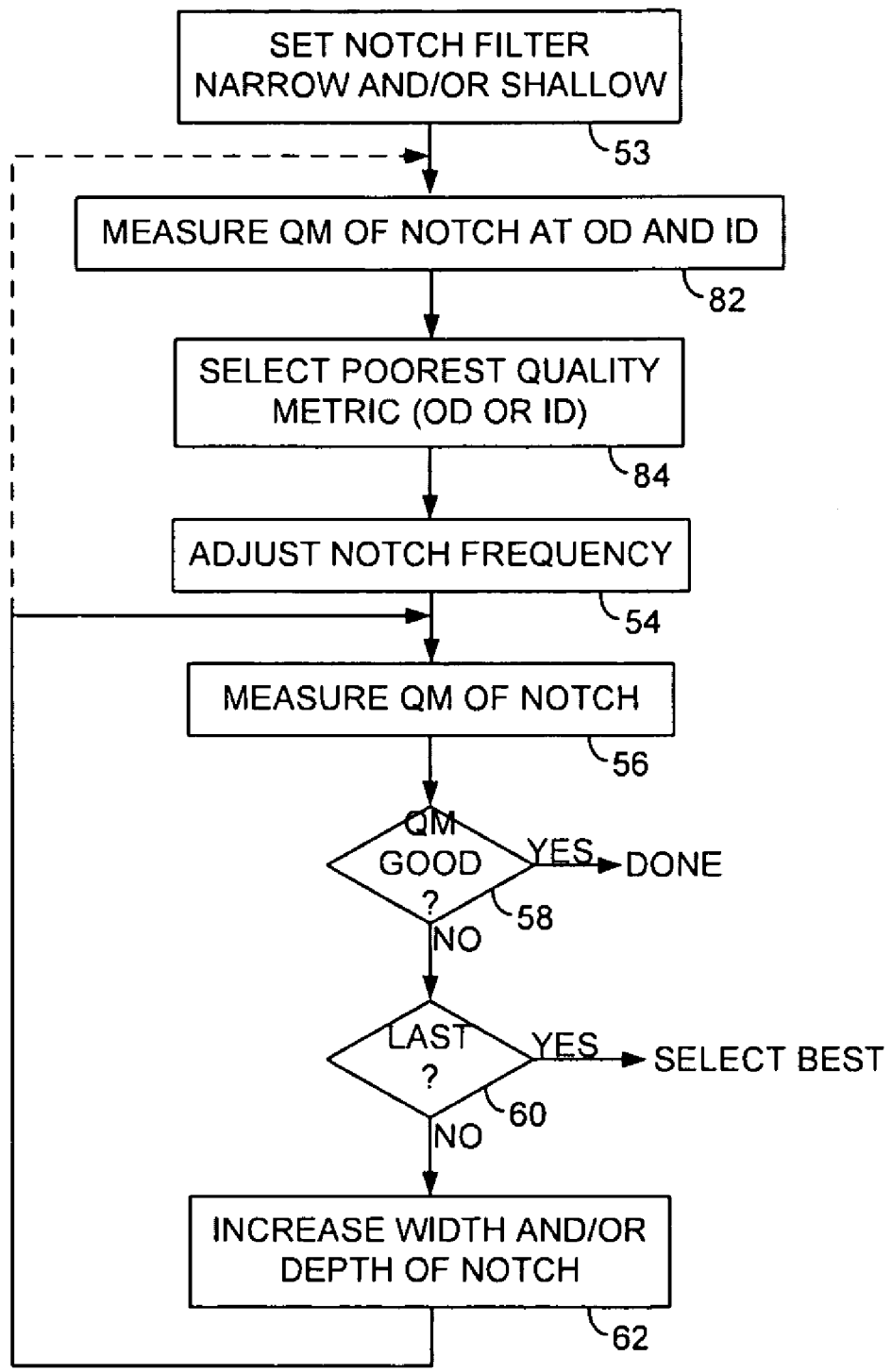
FIG. 8 shows a flow diagram according to an embodiment of the present invention wherein the quality metric of the notch filter is measured at two or more radial locations and the worst quality metric used to calibrate the notch.

In one embodiment, the quality metric of the notch filter is generated while the control circuitry 22 is tracking a target track. FIG. 8 is a flow diagram according to an embodiment of the present invention which expands on the flow diagram of FIG. 6A, wherein the quality metric of the notch filter is measured (step 82) at a first radial location (e.g., at an outer diameter) and at a second radial location (e.g., at an inner diameter). The poorest quality metric is then selected (step 84) in order to calibrate the notch filter. For example, in the embodiment wherein the quality metric is measured relative to a peak in an error rejection curve, the radial location having the highest peak is selected to calibrate the notch filter. In one embodiment, the notch filter is calibrated in response to the quality metric at the radial location selected initially (i.e., the flow diagram is repeated from step 56). In an alternative embodiment, the flow diagram is repeated from step 82 after adjusting the width and/or depth of the notch wherein the radial location for calibrating the notch may change. For example, after adjusting the notch the peak in the error rejection curve at a different radial location may become the highest peak, and therefore selected to continue the calibration of the notch filter. The quality metric may be measured at any suitable number of radial locations, such as at an outer diameter, a middle diameter, and an inner diameter.

In one embodiment, a single set of notch filter parameters are calibrated to cover the entire surface of the disk (OD to ID). In an alternative embodiment, a set of notch filter parameters may be calibrated at multiple radial locations, such as at different zones across the radius of the disk. During normal operation, when the head crosses over into a new zone, the notch filter is programmed with the corresponding parameters for the new zone.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk;
    a head;
    a voice coil motor (VCM) for actuating the head over the disk; and
    control circuitry comprising a notch filter for generating a VCM control signal, wherein a notch of the notch filter comprises a frequency, a width, and a depth, the control circuitry further operable to calibrate the notch filter by:
        initialize the width of the notch to a first width setting and measure a quality metric of the notch filter;
        when the quality metric indicates poor performance, sweep the depth of the notch over a range of settings for the first width setting;
        when the depth of the notch filter reaches a last setting and the quality metric continues to indicate poor performance, increase the width of the notch to a second width setting and re-measure the quality metric of the notch filter; and
        when the quality metric continues to indicate poor performance, sweep the depth of the notch over the range of settings for the second width setting.

2. The disk drive as recited in claim 1, wherein a transfer function of the notch filter comprises:

$$\frac{A_0 + (A_1 + C_1(f - f_0))z^{-1} + A_2 z^{-2}}{B_0 + (B_1 + D_1(f - f_0))z^{-1} + B_2 z^{-2}}$$

where f is the frequency of the notch, $f_0$ is a linearized center frequency, and $A_0, A_1, A_2, B_0, B_1, B_2, C_1$ and $D_1$ are coefficients.

3. The disk drive as recited in claim 2, wherein $A_0, A_1, A_2, B_0, B_1, B_2, C_1$ and $D_1$ are adjusted to increase at least one of the width and the depth of the notch.

4. The disk drive as recited in claim 1, wherein when the quality metric indicates poor performance, the control circuitry is further operable to adjust the frequency of the notch.

5. The disk drive as recited in claim 4, wherein the control circuitry is further operable to adjust the frequency of the notch in response to a measured temperature.

6. The disk drive as recited in claim 1, wherein the quality metric is measured relative to a peak in an error rejection curve.

7. The disk drive as recited in claim 1, wherein the control circuitry is further operable to adjust the frequency of the notch relative to a peak in an error rejection curve.

8. The disk drive as recited in claim 1, wherein the control circuitry is further operable to:
    initialize the width of the notch to a first width setting;
    initialize the depth of the notch to a first depth setting; and
    when the quality metric indicates poor performance, increase the width and the depth of the notch.

9. The disk drive as recited in claim 8, wherein the control circuitry is further operable to adjust the frequency of the notch for each width and depth setting so that the adjusted frequency substantially matches a peak in an error rejection curve.

10. The disk drive as recited in claim 1, wherein the control circuitry is further operable to adjust the frequency of the notch for each depth setting so that the adjusted frequency substantially matches a peak in an error rejection curve.

11. The disk drive as recited in claim 1, the control circuitry is further operable to:
    measure a first quality metric at a first radial location and measure a second quality metric at a second radial location; and
    select the quality metric indicating the poorest performance to calibrate the notch filter.

12. A method of operating a disk drive, the disk drive comprising
    a disk, a head, a voice coil motor (VCM) for actuating the head over the disk, and
    a notch filter for generating a VCM control signal, wherein a notch of the notch filter comprises a frequency, a width, and a depth, the method comprising:
        initializing the width of the notch to a first width setting and measuring a quality metric of the notch filter;
        when the quality metric indicates poor performance, sweeping the depth of the notch over a range of settings for the first width setting;
        when the depth of the notch filter reaches a last setting and the quality metric continues to indicate poor performance, increasing the width of the notch to a second width setting and re-measuring the quality metric of the notch filter; and
        when the quality metric continues to indicate poor performance, sweeping the depth of the notch over the range of settings for the second width setting.

13. The method as recited in claim 12, wherein a transfer function of the notch filter comprises:

$$\frac{A_0 + (A_1 + C_1(f - f_0))z^{-1} + A_2 z^{-2}}{B_0 + (B_1 + D_1(f - f_0))z^{-1} + B_2 z^{-2}}$$

where f is the frequency of the notch, $f_0$ is a linearized center frequency, and $A_0, A_1, A_2, B_0, B_1, B_2, C_1$ and $D_1$ are coefficients.

14. The method as recited in claim 13, further comprising adjusting $A_0, A_1, A_2, B_0, B_1, B_2, C_1$ and $D_1$ to increase at least one of the width and the depth of the notch.

15. The method as recited in claim 12, wherein when the quality metric indicates poor performance, further comprising adjusting the frequency of the notch.

16. The method as recited in claim 15, further comprising adjusting the frequency of the notch in response to a measured temperature.

17. The method as recited in claim 12, wherein the quality metric is measured relative to a peak in an error rejection curve.

18. The method as recited in claim 12, further comprising adjusting the frequency of the notch relative to a peak in an error rejection curve.

19. The method as recited in claim 12, further comprising:
  initializing the width of the notch to a first width setting;
  initializing the depth of the notch to a first depth setting; and
  when the quality metric indicates poor performance, increasing the width and the depth of the notch.

20. The method as recited in claim 19, further comprising adjusting the frequency of the notch for each width and depth setting so that the adjusted frequency substantially matches a peak in an error rejection curve.

21. The method as recited in claim 12, further comprising adjusting the frequency of the notch for each depth setting so that the adjusted frequency substantially matches a peak in an error rejection curve.

22. The method as recited in claim 12, further comprising:
  measuring a first quality metric at a first radial location and measuring a second quality metric at a second radial location; and
  selecting the quality metric indicating the poorest performance to calibrate the notch filter.

23. A disk drive comprising:
  a disk;
  a head;
  a voice coil motor (VCM) for actuating the head over the disk; and
  control circuitry comprising a notch filter for generating a VCM control signal, wherein a notch of the notch filter comprises a frequency, a width, and a depth, the control circuitry further operable to calibrate the notch filter by:
  initialize at least one of the width and the depth of the notch;
  measure a quality metric of the notch filter; and
  increase at least one of the width and the depth of the notch until the quality metric indicates good performance,
  wherein a transfer function of the notch filter comprises:

$$\frac{A_0 + (A_1 + C_1(f - f_0))z^{-1} + A_2 z^{-2}}{B_0 + (B_1 + D_1(f - f_0))z^{-1} + B_2 z^{-2}}$$

where f is the frequency of the notch, $f_0$ is a linearized center frequency, and $A_0, A_1, A_2, B_0, B_1, B_2, C_1$ and $D_1$ are coefficients.

24. A disk drive comprising:
  a disk;
  a head;
  a voice coil motor (VCM) for actuating the head over the disk; and
  control circuitry comprising a notch filter for generating a VCM control signal, wherein a notch of the notch filter comprises a frequency, a width, and a depth, the control circuitry further operable to calibrate the notch filter by:
  initialize at least one of the width and the depth of the notch;
  measure a quality metric of the notch filter;
  increase at least one of the width and the depth of the notch until the quality metric indicates good performance;
  measure a first quality metric at a first radial location and measure a second quality metric at a second radial location; and
  select the quality metric indicating the poorest performance to calibrate the notch filter.

* * * * *